(12) United States Patent
Kim et al.

(10) Patent No.: US 6,600,634 B1
(45) Date of Patent: Jul. 29, 2003

(54) MICRO ACTUATOR

(75) Inventors: Seok-jung Kim, Suwon (KR);
Yong-hoon Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 361 days.

(21) Appl. No.: 09/676,757

(22) Filed: Oct. 2, 2000

(30) Foreign Application Priority Data

Oct. 21, 1999 (KR) .......................... 1999-45851

(51) Int. Cl.[7] .............. G11B 5/596; G11B 5/55
(52) U.S. Cl. .................... 360/294.5
(58) Field of Search ............ 360/294.1, 294.2, 360/294.3, 294.5, 264.5, 78.05, 234.7, 234.8, 234.9

(56) References Cited

U.S. PATENT DOCUMENTS

| | | | |
|---|---|---|---|
| 5,834,864 A | * 11/1998 | Hesterman et al. | ... 310/40 MM |
| 5,920,978 A | * 7/1999 | Koshikawa et al. | ..... 29/603.12 |
| 6,078,473 A | * 6/2000 | Crane et al. | ............. 360/294.3 |
| 6,078,476 A | * 6/2000 | Magee et al. | ............. 360/294.3 |
| 6,122,149 A | * 9/2000 | Zhang et al. | ............. 360/294.5 |
| 6,198,606 B1 | * 3/2001 | Boutaghou et al. | ...... 360/294.3 |
| 6,335,850 B1 | * 1/2002 | Dunfield et al. | ......... 360/294.5 |
| 6,359,752 B1 | * 3/2002 | Imamura | ................. 360/234.7 |
| 6,362,939 B1 | * 3/2002 | Crane et al. | ............. 360/294.5 |
| 6,501,623 B1 | * 12/2002 | Sassolini et al. | ......... 360/245.3 |

FOREIGN PATENT DOCUMENTS

| | | | |
|---|---|---|---|
| JP | 3-134873 | * | 6/1991 |
| JP | 9-180381 | * | 7/1997 |
| JP | 2000-268517 | * | 9/2000 |
| WO | 98/25264 | * | 6/1998 |

* cited by examiner

Primary Examiner—David L. Ometz
(74) Attorney, Agent, or Firm—Staas & Halsey LLP

(57) ABSTRACT

A micro actuator for moving a head device in a track direction of a recording medium by a magnetic force generated between the magnetic cores. In normal use, the micro actuator is mounted on an actuator arm which pivots in a track direction across a track of the recording medium. The slider moves above the recording medium and has an accommodating portion facing the recording medium. A first magnetic core is arranged to move in the accommodating portion, for supporting the head device. A second magnetic core, separated a predetermined distance from and facing the first magnetic core, is installed in the accommodating portion such that the center of the first magnetic core in a magnetic direction, which is perpendicular to the track direction and horizontal with respect to the surface of the recording medium, is offset from the center of the first magnetic core. A first magnetic coil is wound around the first magnetic core so that the axis of the first magnetic coil runs in the vertical direction and a magnetic force in a direction perpendicular to a surface of the recording medium is generated when current is applied. Leaf springs elastically connects the first magnetic core and the inner side of the accommodating portion in the track direction. When current is applied to the first magnetic coil, the first magnetic core is moved in the track direction by a magnetic force generated between the magnetic cores.

25 Claims, 9 Drawing Sheets

MICRO ACTUATOR

CROSS-REFERENCE TO RELATED APPLICATIONS

This application claims the benefit of Korean Application No. 99-45851, filed Oct. 21, 1999, in the Korean Patent Office, the disclosure of which is incorporated herein by reference.

BACKGROUND OF THE INVENTION

1. Field of the Invention

The present invention relates to a micro actuator for supporting and finely moving a head device for recording or reproducing information on or from a recording medium.

2. Description of the Related Art

In general, a disk drive such as a hard disk drive (HDD) includes a head suspension assembly for supporting a head for recording or reproducing information on or from a track of a disk rotatably installed in a housing.

The head suspension assembly includes a rod beam, that is, a suspension, supported at an end portion of an actuator arm pivoted by a voice coil motor (VCM), a gimbal connected to an end portion of the suspension, and a slider supported at the gimbal and having the head. The suspension pivots together with the actuator arm by a driving force of the voice coil motor. While pivoting the suspension transfers the slider to a predetermined position across a disk. Here, the head supported by and transferred together with the slider must be positioned at a predetermined track, where information to be recorded or reproduced is located, among a plurality of tracks provided at the disk. The tracing of a track by the head is very important for reliability of recorded or reproduced information.

Due to a recent trend in which the storage capacity of compact disc drives is increasing, the track density (track per inch; TPI) of the disk has also increased. However, as TPI and the rotation speed of the disk increase, controlling the position of the head precisely becomes more difficult. To solve this difficulty, a head suspension assembly having an additional precise tracking motor or a micro actuator has been suggested.

Figure 1:
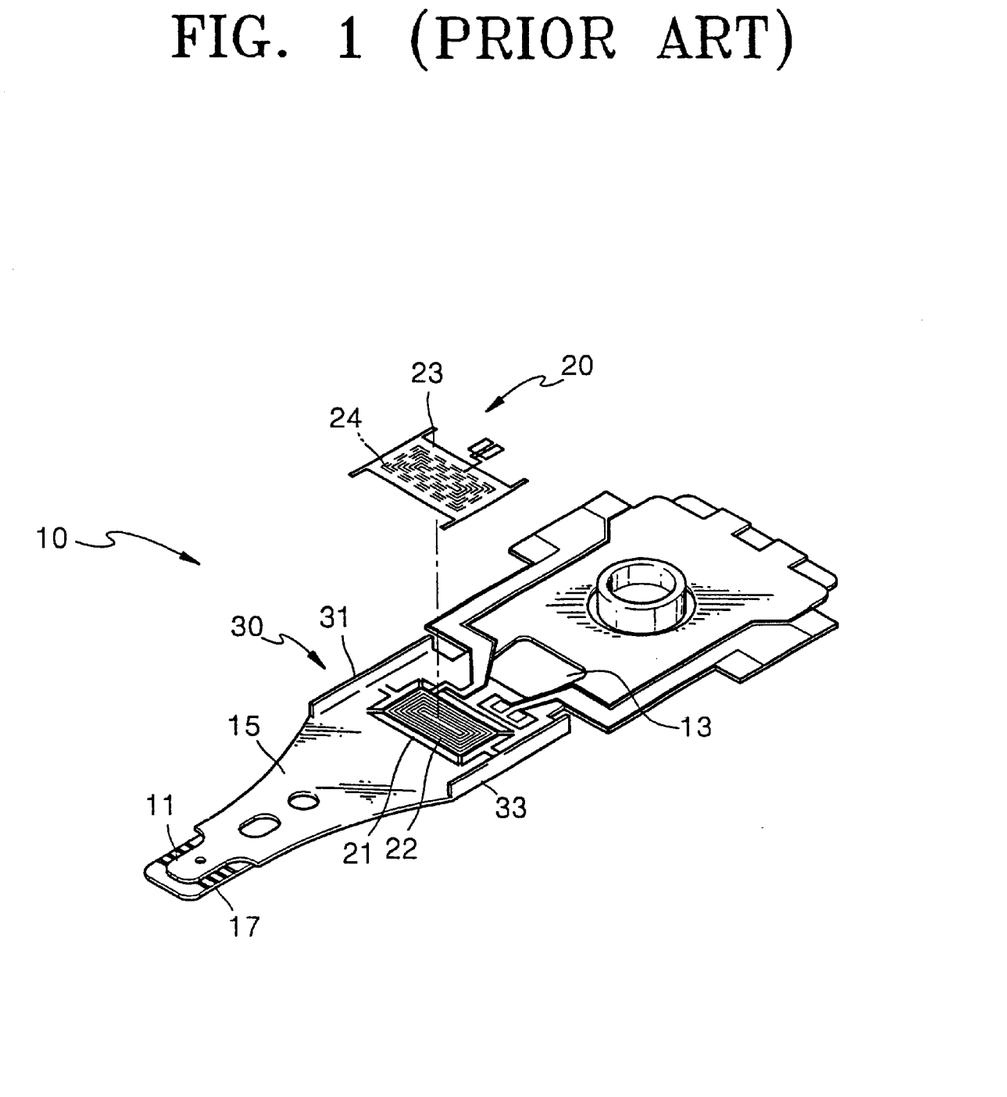
FIG. 1 is a perspective view showing the head suspension assembly having the conventional micro actuator.

FIG. 1 shows a head suspension assembly disclosed in U.S. Pat. No. 5,857,347. The head suspension assembly, as shown in the drawing, includes a rod beam 10 connected to an end portion of an actuator arm (not shown), a Gimbal 17 connected to an end portion of the rod beam 10, a micro actuator 20, and a connection portion 30.

The rod beam 10 has a horizontal portion 15 formed between an end portion 11 and a central end portion 13. The Gimbal. 17 supports a slider (not shown) having a head for recording/reproducing (not shown). The micro actuator 20 has a first coil unit 21 and a second coil unit 23 which are installed consecutively above the upper surface of the rod beam 10. The connection portion 30 elastically connects the end portion 11 and the central end portion 13.

In the above structure, when current is applied to coils 22 and 24 of the first and second coil units 21 and 23, a vertical repulsive force is generated by an electromagnetic force between the respective coil units 21 and 23. Then, as each of the coil units 21 and 23 is moved up and down by the vertical repulsive force, vertical rail portions 31 and 33 of the connection portion 30 receive a force in a horizontal direction. As a result, as the end portion 11 pivots in a horizontal direction with respect to the central end portion 13, that is, in a track direction, the head is finely adjusted together with the slider.

However, in the above conventional micro actuator, many parts are required and the structure is complicated. Thus, practical application is difficult and production is expensive. Also, a great driving force is required to drive the rod beam including the slider, thus, much power is lost in a process for converting the vertical repulsive force generated between the coil units to a force in the horizontal direction.

SUMMARY OF THE INVENTION

To solve the above problems, it is an object of the present invention to provide a micro actuator having an improved structure by which the structure is simplified and a great force can be obtained with low electric power. Additional objects and advantages of the invention will be set forth in part in the description which follows, and, in part, will be obvious from the description, or may be learned by practice of the invention.

Accordingly, to achieve the above and other objects, there is provided a micro actuator comprising a slider supported by an actuator arm which pivots in a track direction across a track of a recording medium, the slide adapted to slide above the recording medium and having an accommodating portion facing the recording medium, a first magnetic core arranged to move in the accommodating portion, for supporting a head device. A second magnetic core is separated a predetermined distance from and facing the first magnetic core and installed in the accommodating portion such that the center of the first magnetic core in a magnetic direction, which is perpendicular to the track direction and horizontal with respect to the surface of the recording medium, is offset from the center of the first magnetic core. A first magnetic coil is wound around the first magnetic core so that the axis of the first magnetic coil runs in the vertical direction and a magnetic force in a direction perpendicular to a surface of the recording medium is generated when current is applied. A leaf spring elastically connects the first magnetic core and the inner side of the accommodating portion in the track direction. When current is applied to the first magnetic coil, the first magnetic core is moved in the track direction by a magnetic force generated between the magnetic cores.

It is preferred in the present invention that the micro actuator further comprises a second magnetic coil wound around the second magnetic core so that, when current is applied, a magnetic force in the magnetic direction is generated.

Also, it is preferred in the present invention that the leaf spring and the slider are integrally formed of a silicon material.

Also, it is preferred in the present invention that the leaf spring comprises a first flat portion parallel to the track direction, and a second flat portion perpendicularly extended from the first flat portion to be parallel to the magnetic direction, in which the respective flat portions are continuously and alternately formed in the track direction.

Also, it is preferred in the present invention that the leaf spring is formed to be continuously and alternately bent in the track direction to have a greater rigidity coefficient value in the magnetic direction than that in the track direction.

Also, it is preferred in the present invention that the first magnetic core comprises a plate type first magnetic portion in which one side thereof can be arranged to be perpendicular to the vertical direction, and a second magnetic portion perpendicularly extended and bent from the first magnetic portion so that one side of the second magnetic portion is perpendicular to the track direction, in which the first and second magnetic portions are continuously and alternately formed in the track direction.

Also, it is preferred in the present invention that the first magnetic coil is repeatedly interwoven back and forth in the track direction around the second magnetic portions and wound around the outside of the second magnetic portion.

According to another aspect of the present invention, there is provided a micro actuator comprising a slider supported by an actuator arm which pivots in a track direction across a track of a recording medium, the slider adapted to slide above the recording medium and having an accommodating portion facing the recording medium. A first magnetic core is arranged to move in the accommodating portion, for supporting a head device. A pair of second magnetic cores is separated a predetermined distance from and facing the first magnetic core with respect to a magnetic direction, which is perpendicular to the track direction and horizontal with respect to the surface of the recording medium, and installed in the accommodating portion such that the respective centers thereof with respect to the magnetic direction are disposed at both sides of the center of the first magnetic core. A first magnetic coil is wound around the first magnetic core with respect to the vertical direction so that a magnetic force in a direction perpendicular to the surface of the recording medium is generated when current is applied. Second magnetic coils are wound around each of the second magnetic cores with respect to the vertical direction so that a magnetic force is generated in the vertical direction when current is applied. A leaf spring elastically connects the first magnetic core and the inner side of the accommodating portion in the track direction. By applying current to the first magnetic coil and selectively applying current to each of the second magnetic coils, the first magnetic core is moved back and forth in the track direction by an electromagnetic force generated between the magnetic cores.

Also, it is preferred in the present invention that the leaf spring is formed to be continuously and alternately bent in the track direction to have a greater rigidity coefficient value than that in the magnetic direction.

BRIEF DESCRIPTION OF THE DRAWINGS

The above and other objects and advantages of the present invention will become more apparent by describing in detail a preferred embodiments thereof with reference to the attached drawings in which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 2:
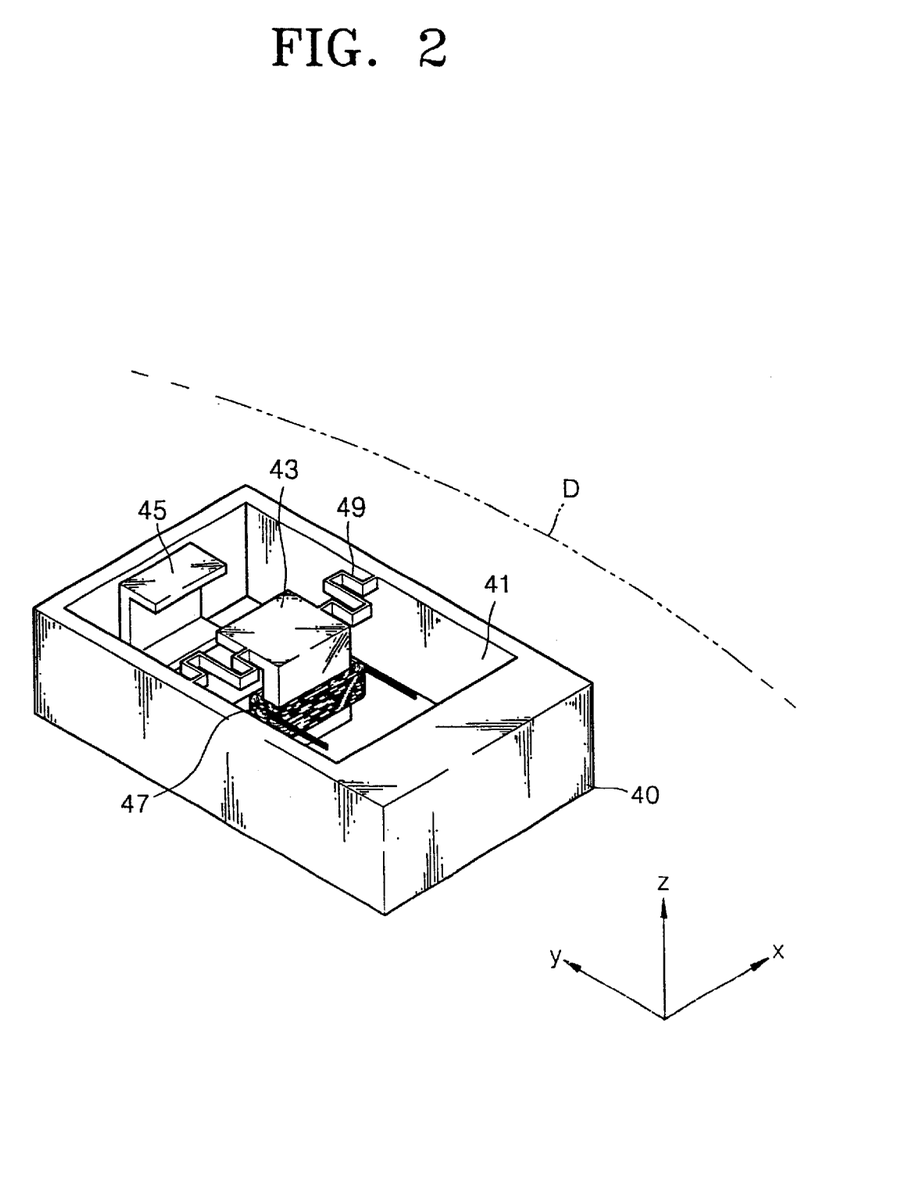
FIG. 2 is a perspective view showing a micro actuator according to a first embodiment of the present invention.

Referring to FIG. 2, a micro actuator according to a first embodiment of the present invention includes a slider 40 adapted to move in a track direction x across a track of a disk (recording medium) D. First and second magnetic cores 43 and 45 are arranged in an accommodating portion 41 of the slider 40. A first magnetic coil 47 is wound around the first magnetic core 43, and leaf springs 49 connect the first magnetic core 43 and the slider 40.

The slider 40 is installed at an end portion of a predetermined actuator arm (not shown). As the actuator arm is pivoted by a predetermined voice coil motor (not shown) in the track direction x on the disk D, the slider 40 slides in the track direction x on the disk D. The slider 40 has the accommodating portion 41 such as a cavity formed in the slider 40 to face the surface of the disk D. The slider 40 is manufactured by performing a silicon processing method including deposition and etching processes on a silicon material.

The first magnet core 43 is arranged to move in the accommodating portion 41. Also, the first magnetic core 43 supports a head device (not shown), which is located at the lower portion of the first magnetic core 43 and faces the disk D, for recording and reproducing information on and from the disk D. Here, the head device may be a magnetic head or an optical head typically used in a hard disk drive (not shown). Also, the first magnetic coil 47 is wound around the outside of the first magnetic core 43. The first magnetic coil 47 is wound around the first magnetic core 43 so that its axis runs in the vertical direction Z with respect to the disk D. Thus, when current is applied to the first magnetic coil 47, a magnetic force is generated in the first magnetic core 43 in the vertical direction z and redirected generally in the y direction by the first magnetic core 43.

Figure 3:
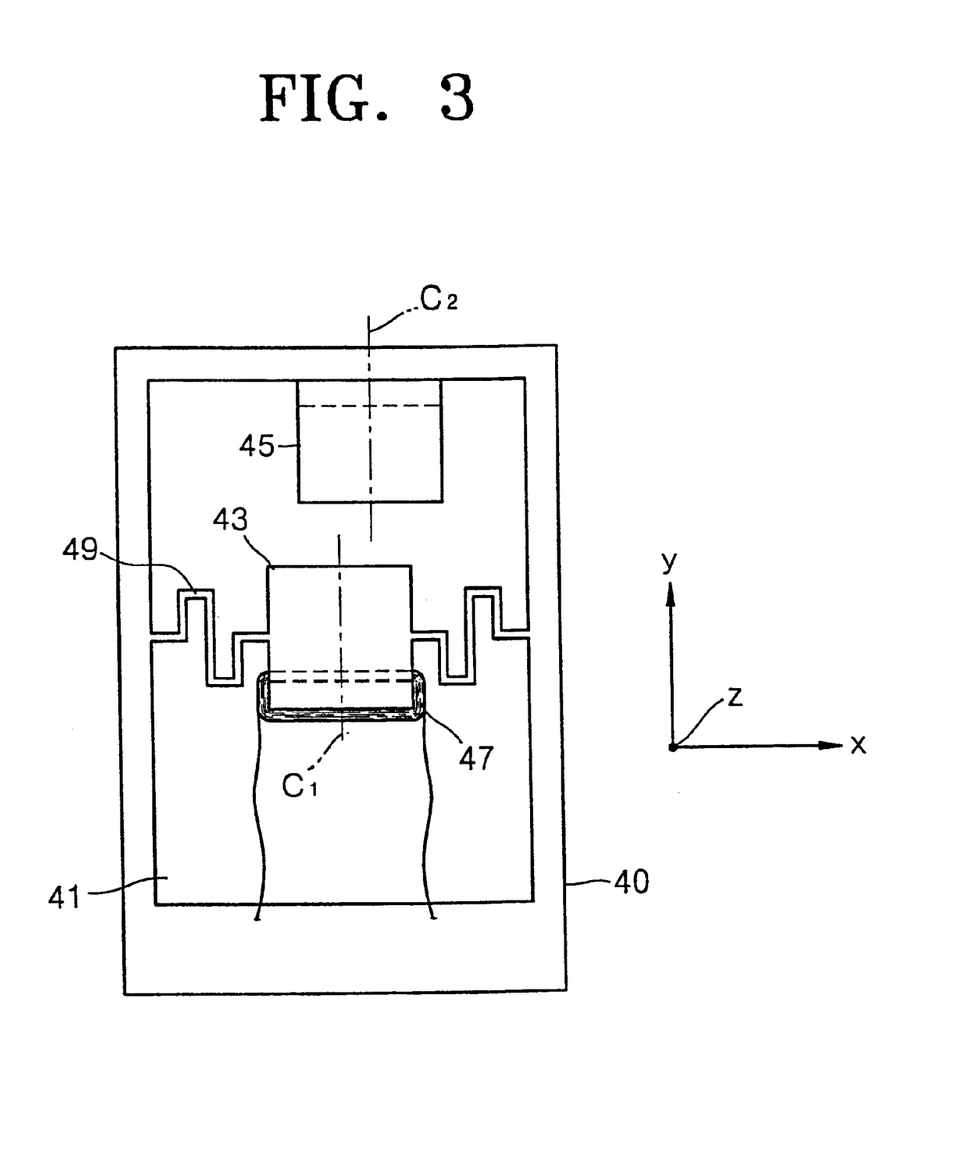
FIG. 3 is a plan view showing the micro actuator of FIG. 2.

The second magnetic core 45 is also installed in the accommodating portion 41. The second magnetic core 45 faces the first magnetic core 43 and is separated a predetermined distance therefrom in a magnetic direction y perpendicular to the track direction x. The second magnetic core 45 is installed such that the center C2 with respect to the magnetic direction y is offset from the center C1 of the first magnetic core 43 as shown in FIG. 3. Here, the first magnetic core 43 and the second magnetic core 45 are typically formed of metal. Each of the magnetic cores 43 and 45 is fabricated by, for example, deposition and etching processes during the process of manufacturing the slider 40.

Figure 4:
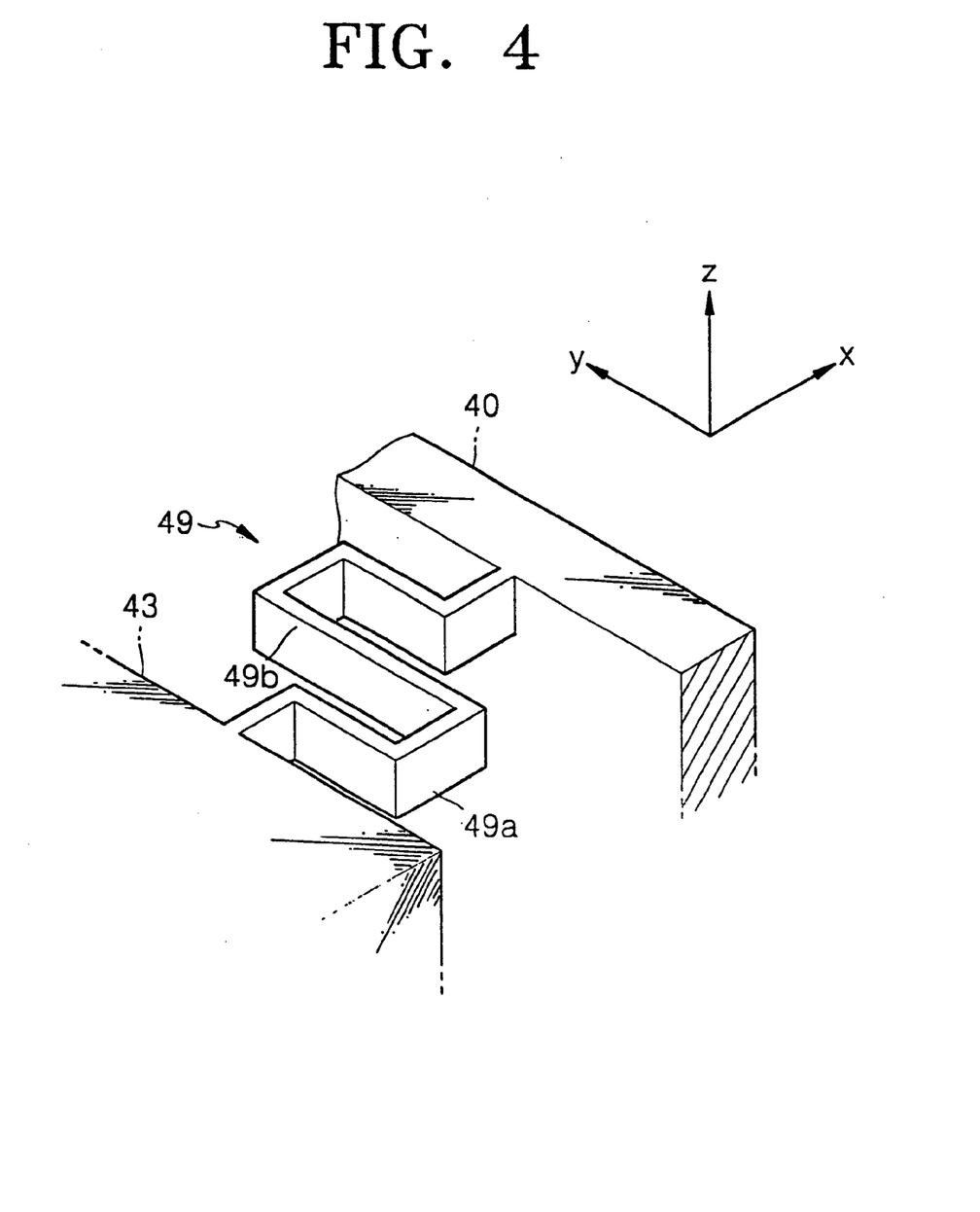
FIG. 4 is a perspective view showing a portion of the leaf spring shown in FIG. 2.

Leaf springs 49 elastically supports the first magnetic core 43 in the accommodating portion 41 in the track direction x. Each leaf spring 49 connects between a side surface of the first magnetic core 43 and an inner side of the accommodating portion 41 in the track direction x. Also, the leaf spring 49 has greater rigidity coefficient values in the magnetic direction y and the vertical direction z than that in the track direction x. Accordingly, as shown in FIG. 4, the leaf spring 49 has a rectangular section and is continuously and alternately bent in the track direction x. In particular, the leaf spring 49 has first flat portions 49a parallel to the track direction x and second flat portions 49b perpendicularly and extending from at least one first flat portion 49a and parallel to the magnetic direction y. The flat portions 49a and 49b are continuously and alternately connected in the track direction x to form a leaf spring 49 in a crenellated or square wave form. The leaf spring 49 is formed of a silicon material. Thus, the leaf spring 49 is formed integrally with the slider 40 through deposition and etching processes during the manufacturing of the slider 40. Also, the leaf spring 49 can be connected by a silicon combining method for combining the leaf spring 49 to the side surface of the first magnetic core 43 at high temperature. Also, the leaf spring 49 can be smoothly formed by deposition and etching processes for manufacturing the slider 40. Due to the characteristics of the leaf spring 49 having the above structure, the first magnetic core 43 moves only in the track direction x, and very little in the magnetic direction y or in the vertical direction z.

Figure 5:
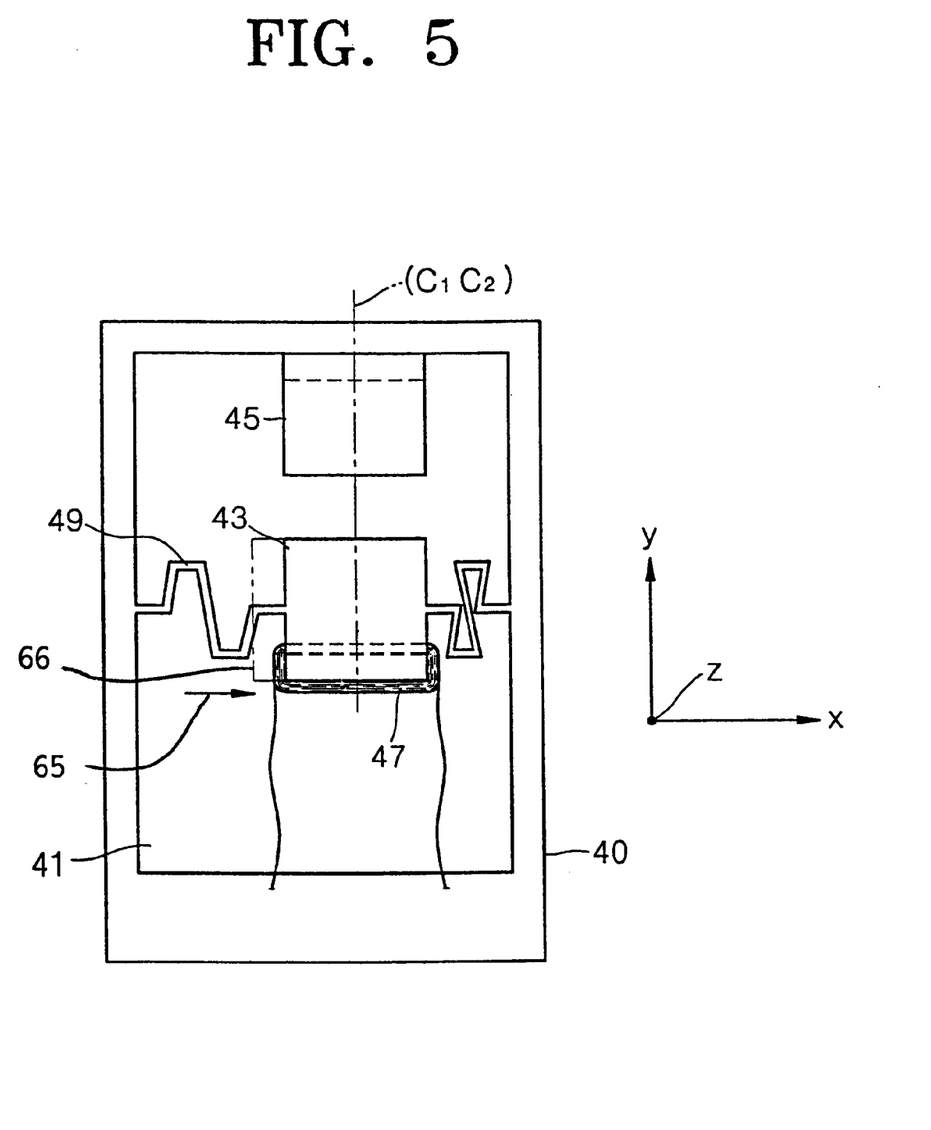
FIG. 5 is a plan view showing the state in which the first magnetic core is moved from the initial position shown in FIG. 3.

In the operation of the micro actuator having the above structure according to the first embodiment of the present invention, as shown in FIG. 3, in the initial state in which the centers C1 and C2 of the magnetic cores 43 and 45 are offset from each other, current is applied to the first magnetic coil 47. Then, the first magnetic core 43 becomes an electromagnet and a magnetic force is generated in the vicinity of the first magnetic core 43. The first magnetic core 43 is attracted toward the second magnetic core 45 formed of metal by the magnetic force. Thus, the first magnetic core 43 is moved while contracting or expanding the leaf spring 49 in the track direction x. When the first magnetic core 43 is moved in the direction of arrow 65, as shown in FIG. 5, the centers C1 and C2 of the magnetic cores 43 and 45 almost match. Here, the centers C1 and C2 are matched or become closer to each other depending on the amount of current applied to the first magnetic coil 47. Also, the movement speed of the first magnetic core 43 is controlled by the amount of current applied to the first magnetic coil 47.

When the strength of current applied to the first magnetic coil 47 is gradually reduced or momentarily cut off in a state in which the centers C1 and C2 are matched, the magnetic force generated in the second magnetic core 45 is reduced or disappears. When the magnetic force disappears, the first magnetic core 43 returns to the initial position, indicated by the imaginary line 66, by an elastic restoration force of the leaf spring 49. The movement of the first magnetic core 43 is generated independent of the movement of the actuator arm for supporting the slider 40. Thus, by controlling whether the current is turned on or off and the strength of the current applied to the first magnetic coil 47, the first magnetic core 43 can be finely moved in the track direction x, that is, with respect to the slider 40. Thus, a precise positional control of the head device supported by the first magnetic core 43 is possible. When the head device can be controlled more precisely, it is possible to increase the density of the hard disk drive or to realize a Near Field Recording Drive (NFRD).

Figure 6:
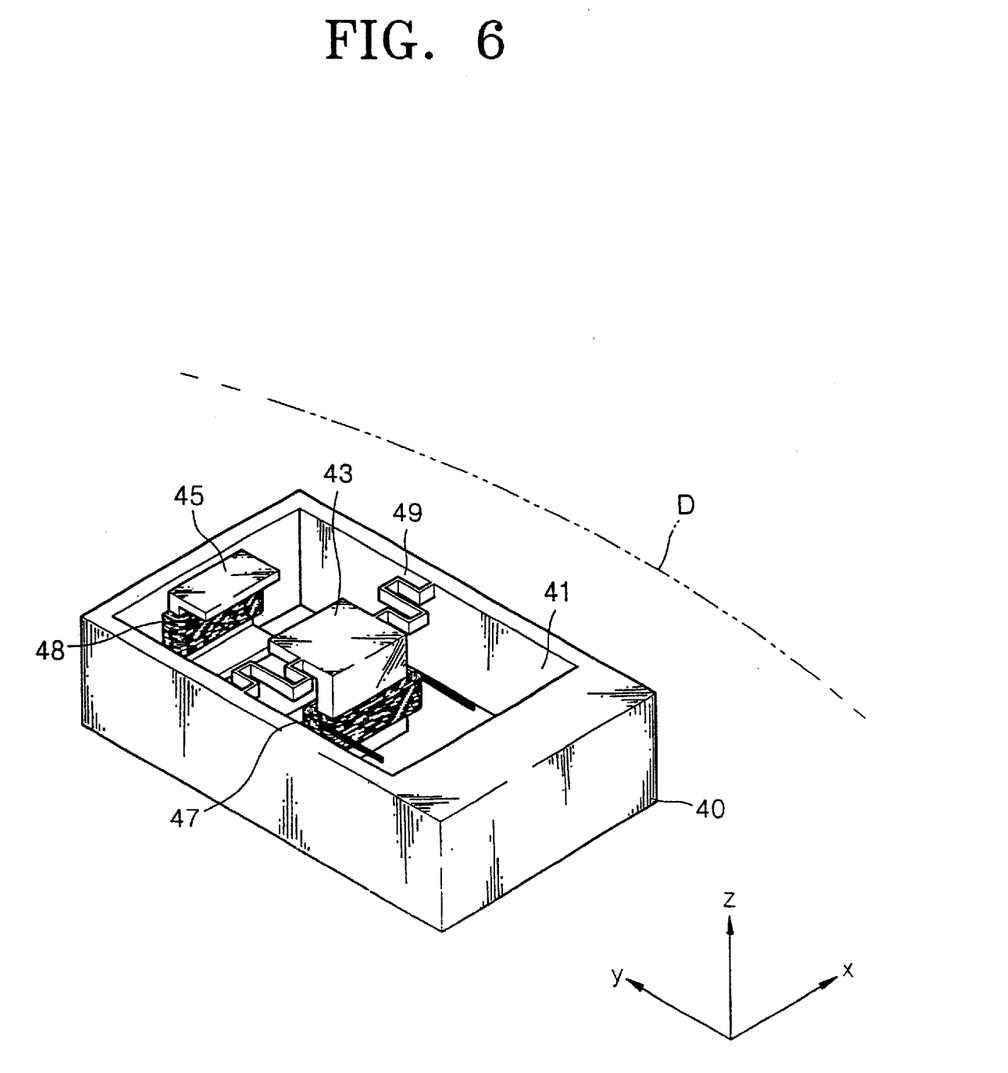
FIG. 6 is a perspective view showing a micro actuator according to a second embodiment of the present invention.

FIG. 6 shows a micro actuator according to a second embodiment of the present invention. Here, elements having the same functions as those in FIG. 2 are denoted by the same reference numerals.

Referring to FIG. 6, the micro actuator according to the second embodiment of the present invention includes a second magnetic coil 48 installed outside of the second magnetic core 45 in addition to the structure of the above-described first embodiment. The second magnetic coil 48 is wound around the second magnetic core 45 so that its axis runs in the vertical direction z like the first magnetic coil 47. Also, the second magnetic coil 48 may be provided outside the second magnetic core 45 by the deposition and etching processes during the manufacturing process of the slider 40. When current is applied to the second magnetic coil 48, a magnetic force is generated in the vertical direction z and redirected generally in the y direction by second magnetic core 45. Thus, by primarily applying current only to the first magnetic coil 47 or the second magnetic coil 48, the first magnetic core 43 and the first magnetic coil 47 can be moved. Secondarily, by applying current to each of the magnetic coils 47 and 48 in the opposing directions, the first magnetic core 43 can be moved. In this case, the N pole and S pole generated in each of the first and second magnetic cores 43 and 45 are formed to face each other.

Figure 7:
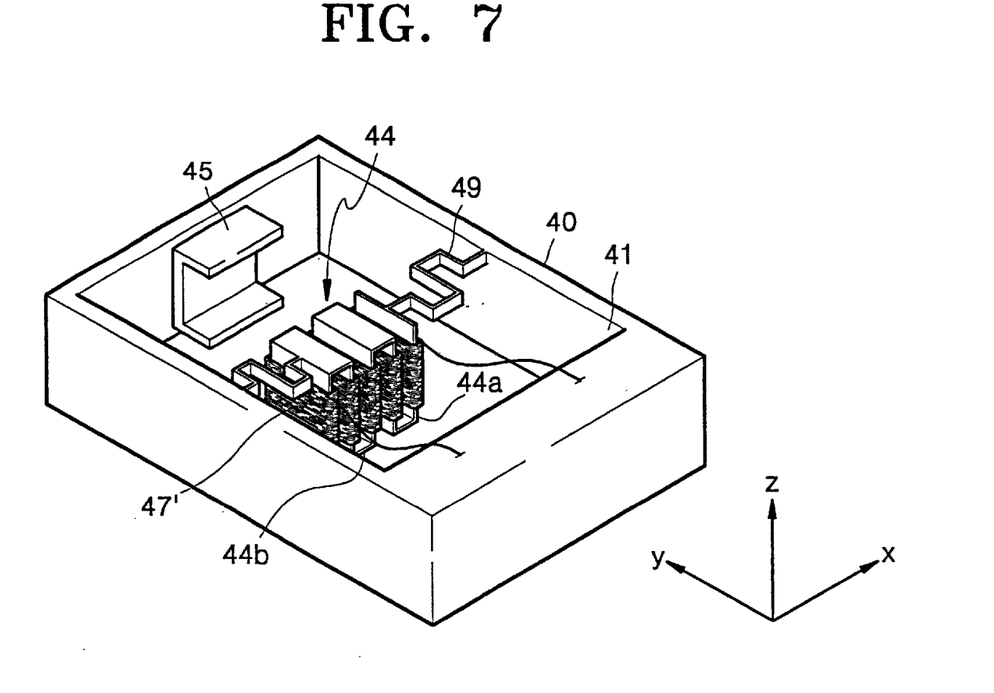
FIG. 7 is a perspective view showing a micro actuator according to a third embodiment of the present invention.

FIG. 7 shows a micro actuator according to a third embodiment of the present invention. Here, elements having the same functions as those in FIG. 2 are denoted by the same reference numerals.

Figure 8:
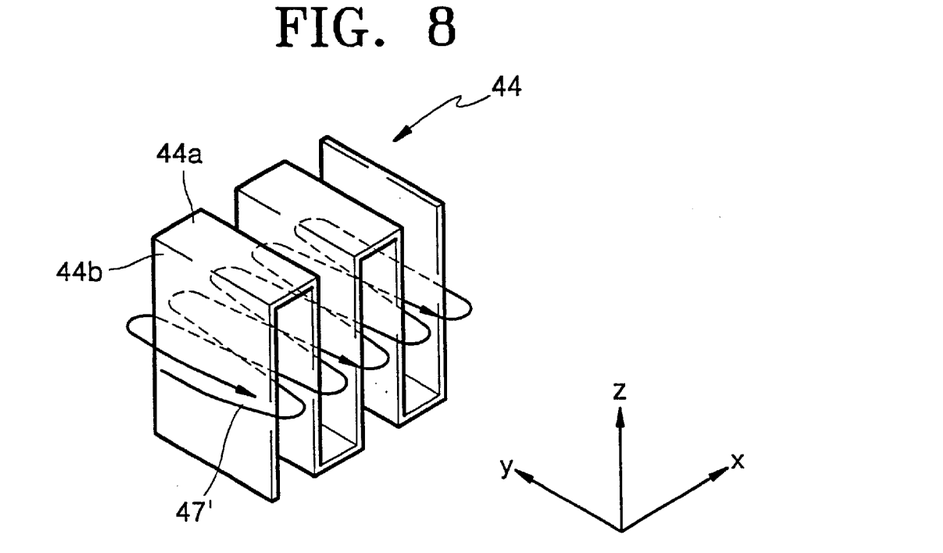
FIG. 8 is a perspective view showing the state in which the first magnetic coil is wound around the first magnetic core of FIG. 7.

Referring to FIG. 7, the characteristic feature of the micro actuator according to the third embodiment of the present invention is that a first magnetic core 44 installed to correspond to the second magnetic core 45 includes first magnetic portions 44a and second magnetic portions 44b. Each first magnetic portion 44a is arranged such that one side thereof is perpendicular to the vertical direction z. Each second magnetic portion 44b is arranged such that one side thereof is perpendicular to the track direction x. Each second magnetic portion 44b is formed to be perpendicularly extended from at least one first magnetic portion 44a in the vertical direction z. That is, the first magnetic core 44 has a structure in which the first magnetic portions 44a and the second magnetic portions 44b are continuously and alternately connected in a crenellated or square wave form. A first magnetic coil 47' installed at the first magnetic core 44 is wound so as to continuously pass along the second magnetic portions 44b. That is, as schematically shown in FIG. 8, the first magnetic coil 47' is repeatedly interwoven back and forth in the track direction x around the second magnetic portions 44b in a serpentine fashion. Thus, the first magnetic coil 47' has a three dimensional structure which is wound around each of the second magnetic portions 44b and is coaxial with the vertical direction z. Since the first magnetic core 44 and the first magnetic coil 47' are installed in the three dimensional structure, when current is applied to the first magnetic coil 47', the strength of a magnetic force generated around the first magnetic core 44 is greater than that in the conventional technology. Thus, a large force is generated with a lower electric power compared to the conventional technology. Also, the effect around the actuator by the generation of an electromagnetic field can be further reduced.

Figure 9:
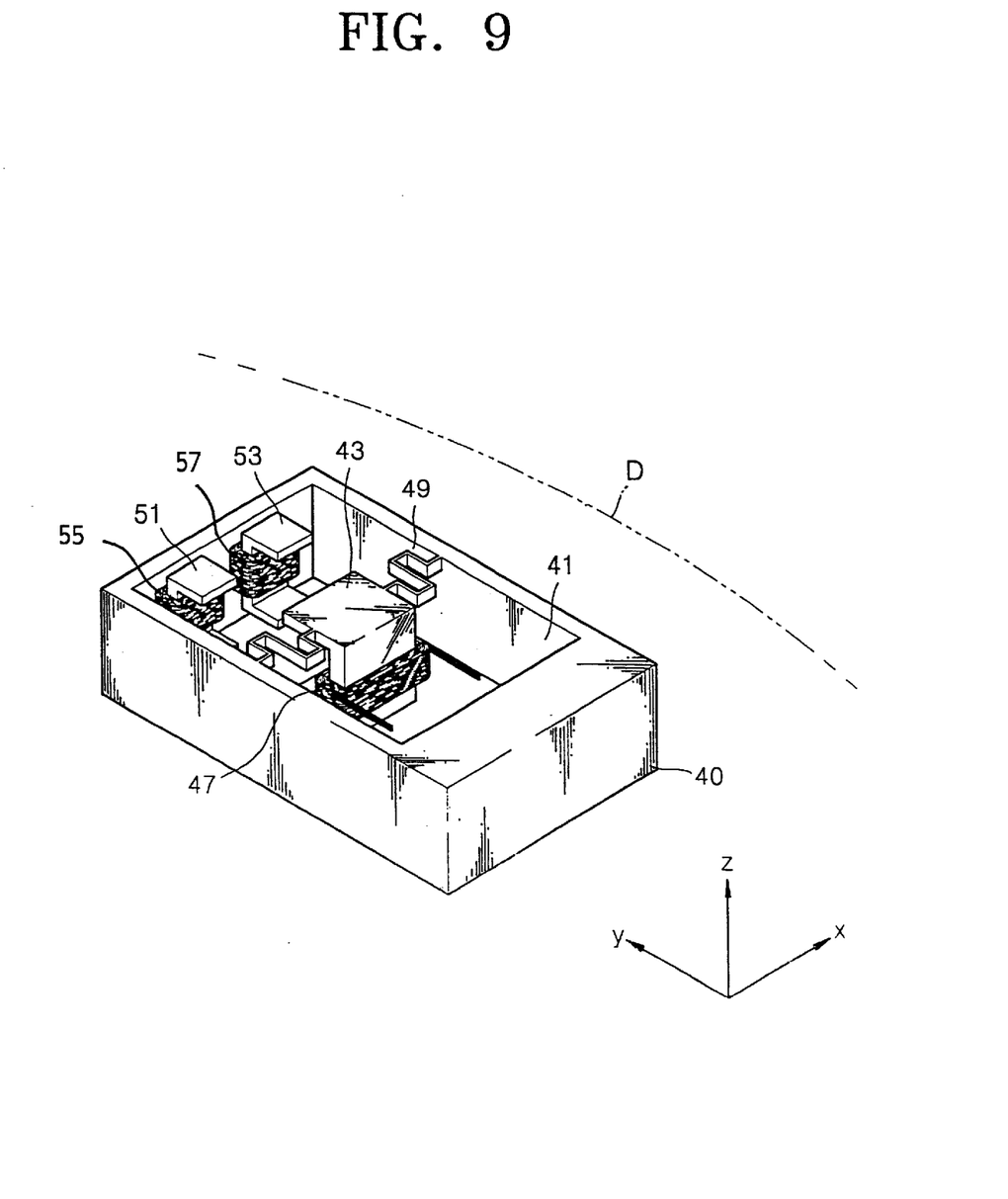
FIG. 9 is a perspective view showing a micro actuator according to a fourth embodiment of the present invention.

FIG. 9 shows a micro actuator according to a fourth embodiment of the present invention. Here, the same reference numerals as those in FIG. 2 denote the same element having the same functions.

Figure 10:
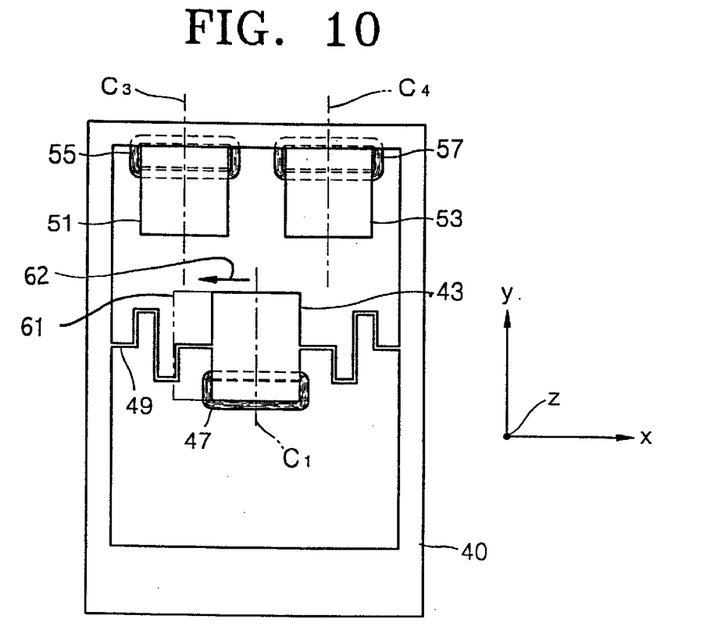
FIG. 10 is a plan view showing the micro actuator of FIG. 9.

Referring to FIG. 9, a pair of second magnetic cores 51 and 53 corresponding to the first magnetic core 43 are installed in the accommodating portion 41 of the slider 40. The second magnetic cores 51 and 53 are positioned so that they are separated from each other and are separated from the first magnetic core 43 by a predetermined distance in the magnetic direction y. Also, as shown in FIG. 10, each of the second magnetic cores 51 and 53 is installed such that the centers C3 and C4 in the magnetic direction y are located at opposite sides of the center C1 of the first magnetic core 43. That is, each of the second magnetic cores 51 and 53 is installed at the same height and the second magnetic cores 51 are separated from each other by a predetermined distance. Also, second magnetic coils 55 and 57 are wound around the second magnetic cores 51 and 53, respectively. The second magnetic coils 55 and 57 are wound around the second magnetic cores 51 and 53 so that their axes run in the vertical direction z and a magnetic force is generated in the vertical direction z when current is applied.

In the operation of the micro actuator having the above structure, first, when current is applied to the second magnetic coil 55, a magnetic force is generated at the second magnetic core 51. When the magnetic force is generated, the first magnetic core 43 is attracted toward the second magnetic core 51 where the magnetic force is generated and moves in the track direction x, as shown by an imaginary line 61 and an arrow 62 in FIG. 10.

Figure 11:
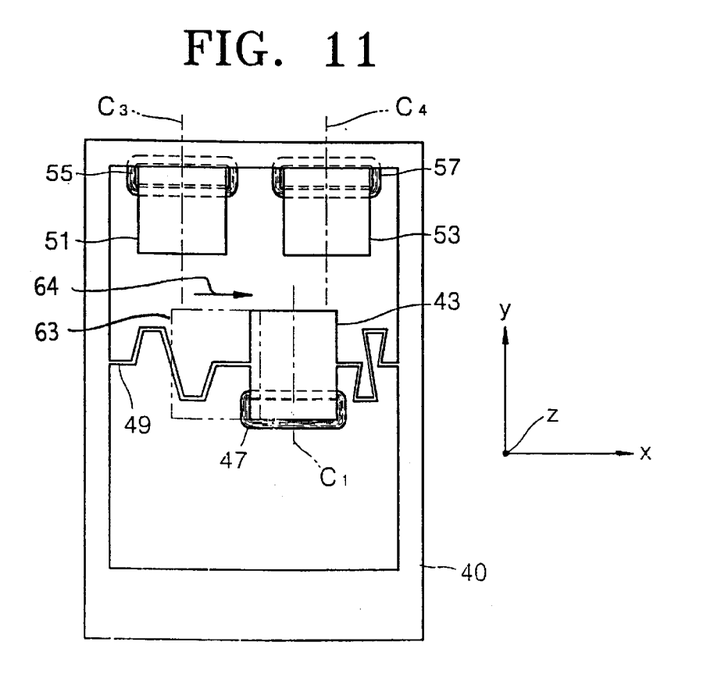
FIG. 11 is a plan view showing the state in which the first magnetic core is moved in a track direction from the initial position shown in FIG. 10.

In the above state, when the current applied to the second magnetic core 55 is cut off and current is applied to the other second magnetic coil 57, a magnetic force is generated in the vicinity of the second magnetic core 53 where the second magnetic coil 57 is wound. Thus, the first magnetic core 43 is moved in the opposite direction by the magnetic force generated around the second magnetic core 53, as indicated by imaginary line 63 and arrow 64 in FIG. 11. Here, since the first magnetic core 43 is moved by the magnetic force as well as an elastic restoration force of the leaf spring 49, precise and rapid control is possible.

As described above, by selectively applying current to the second magnetic coils 55 and 57, the movement direction of the first magnetic core 43 is freely controlled. Also, current is applied not only to the second magnetic coils 55 and 57 but also to the first magnetic coil 47. In this case, a large driving force can be obtained by increasing the magnetic force between the first magnetic core 43 and the second magnetic cores 51 and 53. That is, when current is applied to each of the second magnetic coils 55 and 57 in opposite directions, the directions of the magnetic forces generated by the second magnetic cores 51 and 53 are opposite to each other. In this state, by selectively controlling the direction of the current in the first magnetic coil 47, the movement direction of the first magnetic core 43 can be easily and rapidly controlled.

Also, in the state in which current is applied to the first magnetic coil 47, by applying current to only one of the second magnetic coils 55 and 57 to generate a magnetic force in one of the second magnetic cores 51 and 53, the first magnetic core 43 can be moved.

As described above, the micro actuators according to the embodiments of the present invention have simple structures and thus can be easily manufactured in a compact size. Also, since a larger driving force can be obtained with lower electric power compared to the conventional technology, power consumption can be lowered.

Furthermore, according to the micro actuator according to the present invention, the effect around the actuator by the generation of a magnetic field can be minimized. Also, the micro actuator according to the present invention can be applied when the application of electrostatic driving force is extremely limited, for example, in the air with dust, when a great driving range is required, and when high driving voltage must be avoided or cannot be obtained.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A micro actuator for adjusting the position of a head device relative to an actuator arm and a recording medium, the actuator arm pivoting in a track direction across a track of the recording medium, the micro actuator comprising:

a slider which is supported by the actuator arm and which slides above the recording medium, the slider having an accommodating portion facing the recording medium;

a first magnetic core which supports the head device and which is arranged to move in the accommodating portion;

a second magnetic core separated a predetermined distance from and facing the first magnetic core and installed in the accommodating portion such that the second magnetic core is offset from the first magnetic core in the track direction;

a first magnetic coil wound around the first magnetic core to generate a magnetic force which acts on the second magnetic core in response to a current flow in the first magnetic coil; and a leaf spring elastically connecting the first magnetic core and an inner side of the accommodating portion in the track direction, wherein, in response to a current flow in the first magnetic coil, the first magnetic core is moved in the track direction by the magnetic force.

2. The micro actuator as claimed in claim 1, further comprising a second magnetic coil wound around the second magnetic core to generate a second magnetic force between the first and second magnetic cores in response to a current flow in the second magnetic coil.

3. The micro actuator as claimed in claim 1, wherein the leaf spring and the slider are integrally formed of a silicon material.

4. The micro actuator as claimed in claim 1, wherein the leaf spring comprises:

at least one first flat portion parallel to the track direction, at least one second flat portion, perpendicularly extended from and joining with the first flat portion, wherein first and second flat portions are continuously and alternately joined in the track direction.

5. The micro actuator as claimed in claim 1, wherein the leaf spring is formed to have a greater rigidity coefficient value in a direction transverse to the track direction than a rigidity coefficient value in the track direction.

6. The micro actuator as claimed in claim 1, wherein the first magnetic core comprises:

a plurality of plate type first magnetic portions adjacently arranged and perpendicular to the track direction; and at least one second magnetic portion arranged parallel to the track direction, each second magnetic portion perpendicularly extending from and connecting adjacent first magnetic portions.

7. The micro actuator as claimed in claim 6, wherein the first magnetic coil is repeatedly interwoven back and forth in the track direction around the first magnetic portions.

8. A micro actuator for adjusting the position of a head device relative to an actuator arm and a recording medium, the micro actuator comprising:

a slider which is supported by the actuator arm and which slides above the recording medium, the slider having an accommodating portion facing the recording medium;

a first magnetic core which supports the head device and which is arranged to move in the accommodating portion;

second and third magnetic cores separated a predetermined distance from and facing the first magnetic core and installed in the accommodating portion such that the second magnetic core is offset from said first magnetic core in a first direction and the third magnetic core is offset from said first magnetic core in a second direction, opposite the first direction;

a first magnetic coil wound around the first magnetic core to generate a first magnetic force in response to a current flow in the first magnetic coil;

second and third magnetic coils wound around the second and third magnetic cores, respectively, to generate second and third magnetic forces in response to respective current flows in the second and third magnetic coils; and a leaf spring which elastically connects the first magnetic core and an inner side of the accommodating portion in the track direction, wherein, by applying current to the first magnetic coil and selectively applying current to each of the second and third magnetic coils, the first magnetic core is moved back and forth in the track direction by interaction of the first, second and third magnetic forces.

9. The micro actuator as claimed in claim 8, wherein the leaf spring is continuously and alternately bent in the track direction to have a greater rigidity coefficient value in a direction transverse to the track direction than a rigidity coefficient value in the track direction.

10. A micro actuator for incrementally moving a recording head with respect to a recording medium, the micro actuator comprising:

a slider having a cavity;

a first magnetic core which supports the recording head;

a coil wound around the first magnetic core;

first and second leaf springs which support the first magnetic core in the cavity, the leaf springs having first, second and third rigidity coefficients in directions x, y and z respectively, the second and third rigidity coefficients being greater than the first rigidity coefficient;

a second magnetic core separated a predetermined distance from the first magnetic core and positioned such that a current flowing through the coil produces a magnetic force which interacts with the second magnetic core to move the first magnetic core in the x direction.

11. The micro actuator as claimed in claim 10, wherein:

the first magnetic core comprises:

a plurality of first magnetic portions oriented perpendicular to the x direction; and at least one second magnetic portion oriented parallel to the x direction and connected with said first magnetic portions in a crenellated form; and wherein the coil is wound around the first magnetic portions in a serpentine fashion.

12. The micro actuator as claimed in claim 10, wherein:

the cavity has lateral walls and an end wall;

the leaf springs support the first magnetic core between the lateral walls;

the second magnetic core is mounted on the end wall; and the second magnetic core is offset from the first magnetic core in a direction toward a first of the lateral walls.

13. The micro actuator as claimed in claim 10, further comprising a second coil wound around the second magnetic core such that a current flowing through the second coil produces a magnetic force which interacts with the first magnetic core to move the first magnetic core in the x direction.

14. The micro actuator as claimed in claim 13, further comprising:

a third magnetic core mounted on the end wall and separated a second predetermined distance from the first magnetic core; and a third coil wound around the third magnetic core and positioned such that a current flowing through the third coil produces a magnetic force which interacts with the first magnetic core, to move the first magnetic core in the x direction; and wherein the third magnetic core is offset from the first magnetic core in a direction toward a second of the lateral walls.

15. The micro actuator as claimed in claim 10, wherein each of the first and second leaf springs comprises:

a plurality of first rectangular portions oriented parallel to the x direction; and a plurality of second rectangular portions oriented perpendicular to the x direction and connected with the first rectangular portions in a crenellated form.

16. The micro actuator as claimed in claim 10, wherein the leaf springs and the slider are integrally formed of a silicon material.

17. The micro actuator as claimed in claim 10, wherein the leaf springs and the slider are formed independently of silicon material and joined at high temperature.

18. A micro actuator for incrementally moving a recording head with respect to a track direction of a recording medium, the micro actuator comprising:

a slider having a cavity;

a first magnetic core which supports the recording head;

a coil wound around the first magnetic core;

first and second crenellated leaf springs which support the first magnetic core in the cavity; and a second magnetic core in magnetic communication with the first magnetic core and positioned such that a current flowing through the coil produces a magnetic force which interacts with the second magnetic core to move the first magnetic core in the track direction.

19. The micro actuator as claimed in claim 18, wherein each of the first and second crenellated leaf springs comprise:

a plurality of first leaves adjacently arranged, each first leaf having a surface in a respective plane perpendicular to the recording medium and perpendicular to the track direction; and a plurality of second leaves, each second leaf having a surface in a respective plane perpendicular to the recording medium and parallel to the track direction, one of the plurality of second leaves joining adjacent first leaves, a second of the plurality of second leaves joining a wall of the cavity and one of the plurality of first leaves and a third of the plurality of second leaves joining the first magnetic core and another of the plurality of first leaves.

20. The micro actuator as claimed in claim 19, wherein each of the first and second leaves is rectangular.

21. A micro actuator for incrementally moving a recording head with respect to a track direction of a recording medium, the micro actuator comprising:

a slider having a cavity;

a first magnetic core which supports the recording head, the first magnetic core having a central axis perpendicular to a plane, the plane parallel with the track direction and perpendicular to the recording medium;

a coil wound around the first magnetic core;

first and second springs which support the first magnetic core in the cavity, the first and second springs elongating and contracting in the track direction; and a second magnetic core having a central axis which is offset in the track direction from the central axis of the first magnetic core, wherein a current flowing through the coil produces a magnetic force which interacts with the second magnetic core to move the first magnetic core in the track direction.

22. The micro actuator as claimed in claim 21, wherein each of the first and second springs is more rigid in a direction perpendicular to the track direction rigid than in the track direction.

23. The micro actuator as claimed in claim 22, wherein the first and second springs are leaf springs.

24. The micro actuator as claimed in claim 22, wherein each of the first and second springs comprises:

a plurality of first portions adjacently arranged, each first portion having a surface in a respective plane perpendicular to the recording medium and perpendicular to the track direction; and a plurality of second portions each second portion having a surface in a respective plane perpendicular to the recording medium and parallel to the track direction, one of the plurality of second portions joining adjacent first portions, a second of the plurality of second portions joining a wall of the cavity and one of the plurality of first portions and a third of the plurality of second portions joining the first magnetic core and another of the plurality of first portions.

25. A micro actuator for incrementally moving a recording head with respect to a track direction of a recording medium, the micro actuator comprising:

a slider having a cavity;

a first magnetic core which supports the recording head, the first magnetic core having a central axis;

a coil wound around the first magnetic core;

first and second springs which support the first magnetic core in the cavity, the first and second springs elongating and contracting in the track direction; and a second magnetic core having a central axis which is parallel with the central axis of the first magnetic core and offset in the track direction from the central axis of the first magnetic core, wherein a current flowing through the coil produces a magnetic force which interacts with the second magnetic core to move the first magnetic core in the track direction.

* * * * *